April 19, 1966  K. M. ALLEN ET AL  3,246,737
HELICAL CONVEYOR DRIVE
Filed Feb. 11, 1964  2 Sheets-Sheet 2
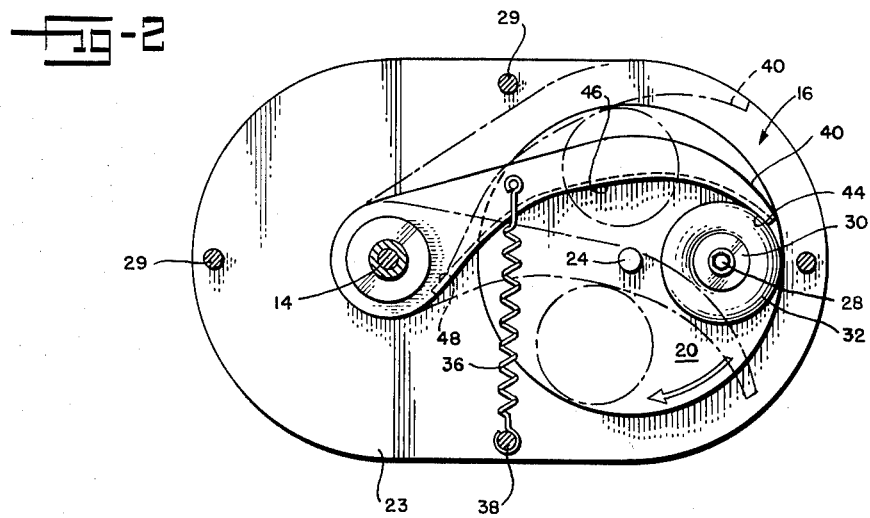
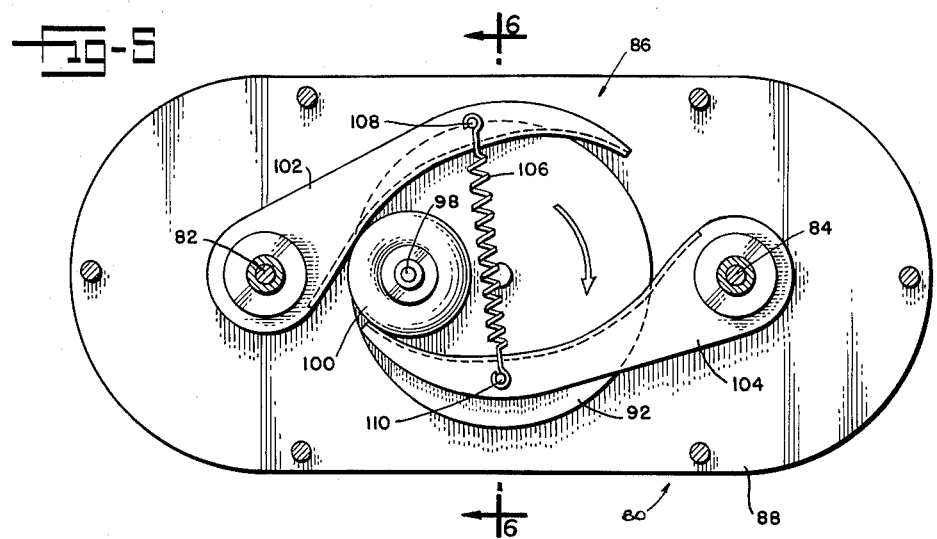
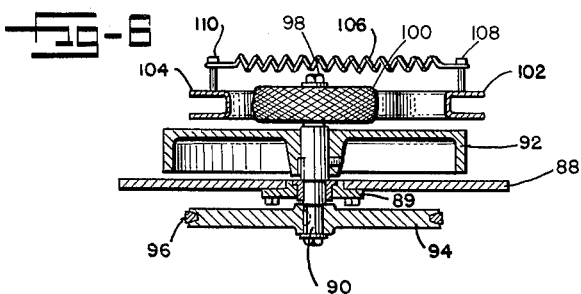
INVENTOR.
Kenneth M. Allen
BY Chester H. Harper
BUCKHORN, BLORE, KLARQUIST & SPARKMAN
ATTORNEYS

# United States Patent Office 3,246,737
Patented Apr. 19, 1966

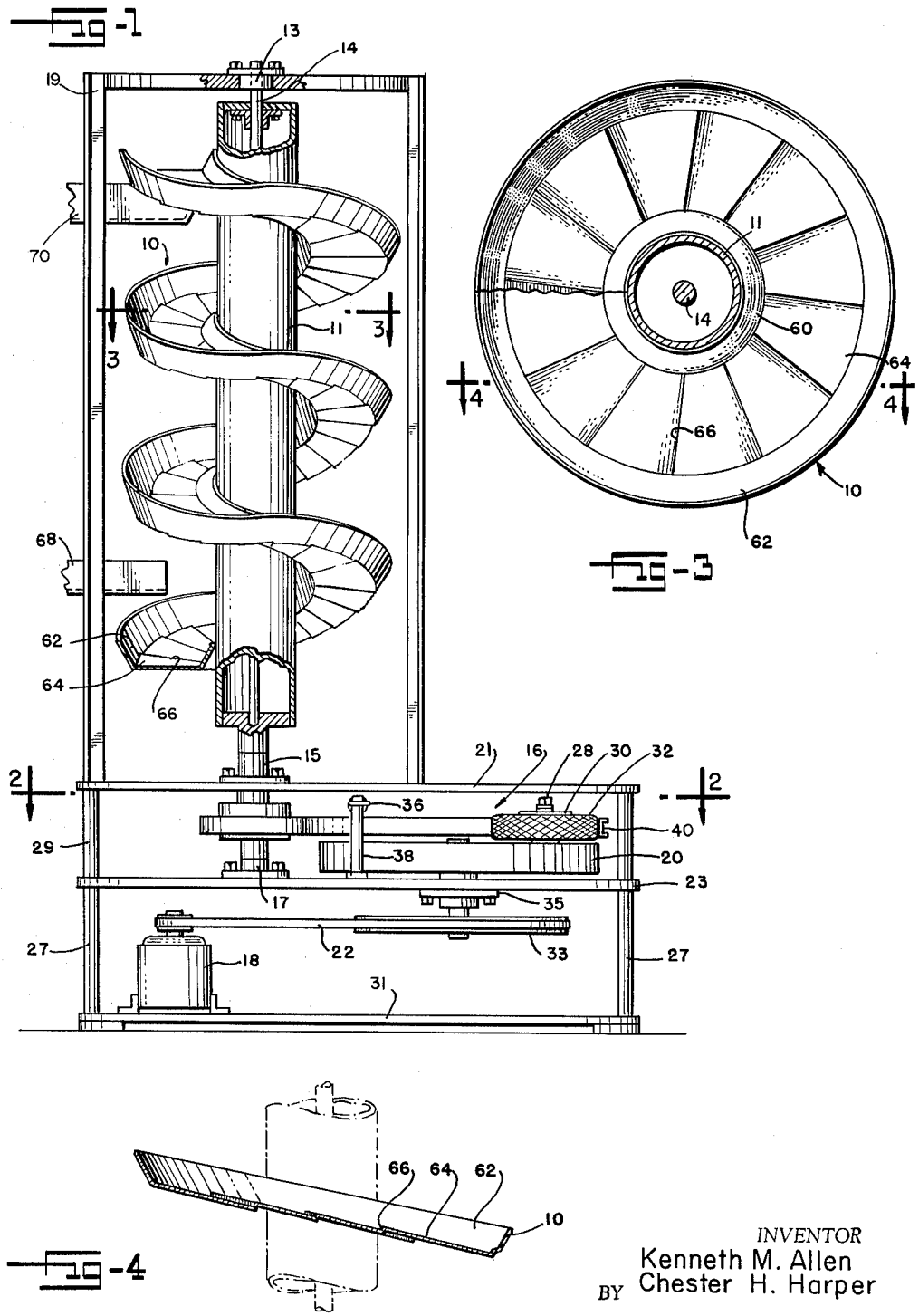

3,246,737
HELICAL CONVEYOR DRIVE
Kenneth M. Allen and Chester H. Harper, both of
P.O. Box 352, Newberg, Oreg.
Filed Feb. 11, 1964, Ser. No. 344,116
9 Claims. (Cl. 198—220)

This invention relates to conveyors, and more particularly to conveyors which provide slow starting, accelerating feed strokes ending with abrupt stops to toss materials being advanced by the conveyors and return strokes that are rapid so as to avoid dragging the materials back with the conveyors.

In reciprocating conveyors which operate at comparatively low frequencies, as contrasted with vibratory conveyors which operate at high frequencies, the ideal condition during the feed stroke is to start the conveyor slowly so that static frictional engagement is maintained with the material being advanced, and thereafter constantly accelerate the feeding movement of the conveyor below the point at which the static frictional engagement is broken between the conveyor and the material and at the end of the feed stroke abruptly stop the feed stroke so that the material is thrown or tossed and retract the conveyor in a return stroke rapidly so as not to drag the material back during the return stroke. Conveyors so operating are disclosed and claimed in our copending application Serial No. 303,599, filed August 21, 1963. However, it would be desirable to provide a conveyor having a drive even more simple than the drives of the conveyors disclosed in said copending application.

An object of the invention is to provide new and improved conveyors.

Another object of the invention is to provide new and improved conveyors having slow starting, accelerating feed strokes ending with abrupt stops to toss materials being advanced by the conveyors and return strokes that are rapid so as to avoid dragging the materials back with the conveyors.

Another object of the invention is to provide a driving mechanism for a conveyor which advances material with a tossing action and which is simple, effective and durable.

The invention provides a conveyor which includes a conveyor bed urged in one direction by a spring and coupled to a cam-shaped follower arm having a crescent-shaped cam surface engaging a crank pin member revolved by a crank. The follower arm is mounted pivotally on an axis parallel to the axis of rotation of the crank and outside the circular path through which the crank pin member is revolved. The cam surface has a first sharply curved portion which is engaged by the crank pin member to drive the conveyor bed in a rapid return stroke. The cam surface also has a second, gently curved, intermediate dwell portion which is shaped to cause substantially a pause in the drive of the conveyor bed at the end of the return stroke and a third, more sharply curved portion engaged by the crank pin member during the feed stroke to cause the final portion of the feed stroke to be rapid to toss the material advanced by the conveyor bed. In a conveyor forming one specific embodiment of the invention, a helical conveyor bed is provided with steps extending outwardly and upwardly along the bottom of the bed. The conveyor bed is supported for oscillation about the pivot axis of a crescent-like, cam-shaped follower arm splined to the conveyor bed. A roller having a rubber tire is mounted on a crank pin, and a spring maintains the follower arm in engagement with the tire.

In a conveyor forming an alternate embodiment of the invention, two helical conveyor troughs are driven 180° out of phase by two crescent-shaped arms held against opposite sides of a crank roller.

A complete understanding of the invention may be obtained from the following detailed description of a conveyor forming a specific embodiment thereof, when read in conjunction with the appended drawings, in which:

FIG. 1 is a fragmentary, partially sectional, side elevation view of a conveyor forming one embodiment of the invention;

FIG. 2 is a fragmentary, horizontal sectional view taken substantially along line 2—2 of FIG. 1;

FIG. 3 is a fragmentary, horizontal sectional view taken along line 3—3 of FIG. 1;

FIG. 4 is a vertical sectional view taken along line 4—4 of FIG. 3;

FIG. 5 is a fragmentary, horizontally sectional view of a conveyor forming an alternate embodiment of the invention; and FIG. 6 is an elevation view taken generally along line 6—6 of FIG. 5.

Referring now in detail to the drawings, there is shown therein a conveyor 9 including a helical conveyor bed or trough 10. A vertical shaft or post 14 keyed to the cylinder 11 is journaled in a radial bearing 13 and radial-and-thrust bearings 15 and 17 respectively mounted on upright frame 19 and plates 21 and 23. A drive 16 oscillates the conveyor bed about the vertical post 14 to advance material up the conveyor bed. The conveyor 16 is supported by a base 31 on which is mounted an electric motor 18 driving a flywheel type crank disc 20 through belt 22 and pulley 33. The crank disc and pulley 31 are keyed to shaft 24 mounted in bearing 35 carried by the plate 23. The plate 23 is supported by spacers 27, and spacers 29 support the plate 21. The crank disc 20 carries crank pin 28, which is revolved by crank disc 20 clockwise as viewed in FIG. 2.

A wheel-like crank roller 30 of a large diameter and having a rubber tire 32 is mounted rotatably on the crank pin 28 by ball bearing mounting portion of the roller 30. The tire is composed of a quite stiff rubber or rubber-like compound and is substantially incompressible in its use in the conveyor described herein. An elongated tension spring 36 secured at one end to a post 38 fixed to the plate 23 is secured at its other end to a cam-shaped follower arm 40, which is generally crescent-shaped. The arm 40 is fixed rigidly to the shaft 14 and is keyed thereto. The spring biases the arm 40 in a clockwise direction, as viewed in FIG. 2, and maintains the arm in contact with the periphery of the tire 32 at all times. The crank disc 20 is rotated clockwise to oscillate the follower arm 40 and the conveyor trough 10 through a feed stroke and a return stroke for each revolution of the roller 30 by the crank disc. The arm 40 has a cam surface defined by a strongly curved outer end portion 44, a short, almost straight but gently curved dwell portion 46 and a strongly curved inner end portion 48. The arm 40 is substantially channel-shaped in transverse cross section as best illustrated in FIG. 1, and the inner end portion of the arm may be, if desired, in the form of a split clamp for attachment rigidly to the shaft 14.

The trough 10 has an inner flange 60 fixed to the cylinder 11 and an outer flange 62. Bottom 64 of the trough is substantially flat except for low steps 66 formed therein. The steps 66 extend, as shown best in FIG. 3, primarily radially outwardly and somewhat upwardly proceeding away from the inner flange 60. As material is fed up the trough by oscillation of the trough, the steps give a pushing action upwardly along the trough and since the steps extend somewhat upwardly along the trough, the steps restrain movement of the material radially outwardly from the centrifugal action of the oscillated trough. A feed chute 68 supplies material to be elevated by the trough 10 to the lower end thereof, and a discharge chute 70 receives material from the upper, discharge end of the trough.

In the operation of the conveyor of FIGS. 1 to 4, material is fed to the lower end of the trough 10 which is moved alternately in a feed stroke and a return stroke by the arm 40. The crank disc 20 is rotated clockwise as viewed in FIG. 2 at a uniform rate of speed, and just after the roller 30 moves past its uppermost position, as viewed in FIG. 2, the roller permits the arm 40 to swing clockwise slowly in the start of the feed stroke. The curved outer end portion 44 of the arm 40 engages the roller 30 throughout the feed stroke of the arm 40 which occurs throughout the remainder of the downward movement of the roller and for a substantial, initial portion of the upward movement of the roller and causes the feed stroke of the arm and the conveyor to be initially slow, accelerate and abruptly stop. Then, the roller engages the dwell portion 46 and immediately starts to swing the arm 40 counterclockwise, to start the return stroke and very shortly thereafter the roller engages the curved portion 48 of the arm to rapidly swing the arm counterclockwise. Then, after the roller passes its extreme left-hand portion of its revolution, the roller travels off the curved portion 48 of the arm to terminate the return stroke. The roller then travels along the dwell portion 46 of the arm without substantial movement of the arm as the cycle ends. Each cycle of the roller produces a slow speed starting portion of the feed stroke of the conveyor which rapidly accelerates and is at a high speed at the end of the feed stroke which stops abruptly, and immediately thereafter the trough is jerked back from under the material being conveyed to break frictional force between the material and the trough. The return stroke slows as it nears the end thereof, and then, while the roller engages the dwell portion 46 at the end of the return stroke, a pause in the movement of the trough occurs so that the frictional engagement between the trough and the material is established. The trough is oscillated on its vertical axis without any raising or lowering thereof, the drive 16 providing such an efficient movement of the trough that raising and lowering of the trough is not needed to very rapidly advance material up the trough.

In FIGS. 5 and 6 there is shown a conveyor 80 forming an alternate embodiment of the invention. The conveyor 80 includes a pair of helical conveyor troughs (not shown) identical with the trough 10 (FIG. 1) and mounted by structure (not shown) similar to the mounting structure of the trough 10 and in positions directly over shafts 82 and 84 to which the two conveyor troughs are keyed. The shafts 82 and 84 are identical with the shaft 14 and form portions of a dual drive 86. The drive 86 also includes mounting plate 88 to which is secured a bearing 89 journaling shaft 90 keyed to crank disc 92. The shaft 90 is driven by a pulley 94 and belt 96 driven by an electric motor (not shown). A crank pin 98 carried eccentrically on disc 92 mounts a large diameter, rubber tired, wheel-like roller 100, and follower arms 102 and 104 keyed to the shafts 82 and 84, respectively, are kept in engagement with opposite sides of the roller 100 by a tension spring 106 secured to the arms 102 and 104 by pins 108 and 110. The arms 102 and 104 are identical with the arm 40, and the roller 100 and its eccentricity are identical with the roller 30 and the eccentricity thereof. The shafts 82 and 84 are positioned 180° apart relative to the crank disc 92 so that the cycles of the arms 102 and 104 are 180° out of phase.

The two conveyor troughs of the conveyor 80 are driven identically with the above described drive of the conveyor trough 10. However, the cycles of the two conveyor troughs are substantially 180° out of phase.

The above conveyors are highly efficient, simple in construction and are easily maintained.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:
1. In combination,
crank pin means,
means for revolving the crank pin means at a uniform rate in a circular path around a predetermined axis,
conveyor means mounted for back and forth movement,
cam means drivingly coupled to the conveyor means and having a generally crescent-shaped cam surface,
means urging the cam means into engagement with the crank pin means,
the cam surface having a first end portion curved to a predetermined extent and engaged by the crank pin to drive the conveyor means in a return stroke, and also having a dwell portion curved substantially less than the first end portion to engage the crank pin means and cause a dwell at the end of the return stroke, and a second end portion curved substantially more than the dwell portion to drive the conveyor means in a feed stroke having a rapid feeding movement at the final portion of the feed stroke of the conveyor means,
the second end portion and the dwell portion joining at a position such as to abruptly change the movement of the conveyor means from the feed stroke to the return stroke.

2. In combination,
crank pin means,
means for revolving the crank pin means at a uniform rate in a circular path around a predetermined first axis,
a helical conveyor trough mounted for oscillation on a second axis parallel to the first axis,
arm means fixed against turning movement relative to the conveyor trough and having a generally crescent shaped cam surface,
and means urging the arm means into engagement with the crank pin means,
the cam surface having an inner end portion curved to a predetermined extent and engaged by the arm means throughout a return stroke of the conveyor trough and also having a dwell portion curved substantially less than the inner end portion to engage the crank pin means and cause a pause of the conveyor trough at the end of the return stroke, and an outer end portion curved to a greater extent than the dwell portion to drive the conveyor bed in a feed stroke having a slow starting portion and rapid end portion,
the cam surface abruptly changing the movement of the conveyor trough from the feed stroke to the return stroke.

3. In combination,
a conveyor trough,
means mounting the conveyor trough for movement in a feed stroke and a return stroke,
a crank pin member,
means for revolving the crank pin means in a circular path of a predetermined diameter around a first axis,
a cam-shaped follower arm mounted for pivotal movement on a second axis parallel to the first axis and positioned outside the circular path,
the follower arm having a generally crescent-like cam surface formed on one side thereof and including a first end portion adjacent the second axis and curved to a predetermined degree,
an intermediate portion more remote from the second axis and substantially less sharply curved than the first end portion and a second end portion more sharply curved and spaced farther from the second axis than the intermediate portion, means pressing the arm against the crank pin member, and means drivingly connecting the arm and the conveyor bed to drive the conveyor bed at a predetermined slow rate of speed during the initial portion of a feed stroke, a much higher rate of speed at the end portion of the feed stroke, stop the conveyor bed sharply at the end of the feed stroke and return the conveyor bed at a high rate of speed in the initial portion of the return stroke.

4. In combination, a conveyor member, a cam-shaped arm drivingly coupled to the conveyor member and having a generally crescent-shaped cam surface, a crank pin revolved about a second axis parallel to the first axis about a circular path, a rubber tire rotatably mounted on the crank pin, and means biasing arm to hold the cam surface in engagement with the rubber tire, whereby the conveyor member is moved through a feed stroke and a return stroke.

5. In combination, a helical conveyor trough mounted for oscillation on a predetermined first axis, an arm fixed to the conveyor trough for oscillation therewith and having a generally crescent-shaped cam surface extending along one side thereof, a crank pin revolved about a second axis parallel to the first axis about a circular path, a roller mounted rotatably on the crank pin, means biasing the arm toward the roller to press the cam surface into engagement with the roller, the cam surface having a first end portion engaging the crank pin during a return stroke of the conveyor trough and serving to rapidly move the conveyor bed through at least the initial portion of the return stroke, the cam surface also having a dwell portion joined to the first end portion for substantially stopping movement of the conveyor trough between the return stroke and a feed stroke thereof and also having a second end portion engaging the roller during the feed stroke to drive the conveyor trough rapidly during the end portion of the feed stroke.

6. In combination, a helical conveyor trough mounted vertically for oscillation about the longitudinal axis thereof, an arm fixed at one end to the conveyor trough and extending generally radially relative to said longitudinal axis, the arm having a crescent-shaped follower surface, a crank member revolved about a vertical axis parallel to said longitudinal axis, and means biasing the arm toward the crank member to hold the crescent-shaped cam surface in operative engagement with the crank member to oscillate the crank member.

7. In combination, a crank shaft member, rotated on a predetermined axis, a crank roller mounted eccentrically on the crank shaft member, an arm mounted pivotally on a second axis parallel to said predetermined axis and having a concave, crescent-shaped cam surface adapted to engage the crank roller, means biasing the arm toward the roller to hold the cam surface in engagement with the roller, and conveyor means drivingly coupled to the arm, 8. In combination, crank pin means revolved about a predetermined axis, a pair of curved arms mounted pivotally on separate, parallel axes spaced around said predetermined axis, means biasing the arms into engagement with the crank pin means, and a pair of separate conveyor devices drivingly coupled separately to the arms.

9. In combination, a pair of helical conveyor troughs mounted vertically for oscillation about laterally spaced vertical axes thereof, crank means rotatable about an axis parallel to and positioned between said vertical axes, a pair of identical arms having crescent-shaped cam surfaces and keyed to the conveyor trough and extending generally radially away from said vertical axes, and spring means biasing the arms in opposite directions and against opposite sides of the crank means.

References Cited by the Examiner

UNITED STATES PATENTS

| | | | |
|---|---|---|---|
| 1,085,528 | 1/1914 | Bighetti | 209—362 |
| 1,633,945 | 6/1927 | MacClatchie | 75—54 |
| 2,021,639 | 11/1935 | Robinson | 74—45 |
| 2,818,968 | 1/1958 | Carrier. | |
| 3,038,589 | 6/1962 | Allen. | |

SAMUEL F. COLEMAN, *Primary Examiner.*

EDWARD A. SROKA, *Examiner.*